US012771774B2

(12) United States Patent
Xu et al.

(10) Patent No.: US 12,771,774 B2
(45) Date of Patent: Oct. 20, 2026

(54) METHOD AND APPARATUS FOR GENERATING IMAGERY RECORD, ELECTRONIC DEVICE, AND STORAGE MEDIUM

(71) Applicant: Douyin Vision (Beijing) Co., Ltd., Beijing (CN)

(72) Inventors: Feng Xu, Beijing (CN); Yi Mo, Beijing (CN)

(73) Assignee: Douyin Vision (Beijing) Co., Ltd., Beijing (CN)

(*) Notice: Subject to any disclaimer, the term of this patent is extended or adjusted under 35 U.S.C. 154(b) by 513 days.

(21) Appl. No.: 18/335,739

(22) Filed: Jun. 15, 2023

(65) Prior Publication Data

US 2023/0412723 A1 Dec. 21, 2023

(30) Foreign Application Priority Data

Jun. 16, 2022 (CN) ........................ 202210684581.X

(51) Int. Cl.
*H04N 7/28* (2006.01)
*H04M 1/72427* (2021.01)
*H04M 1/72451* (2021.01)

(52) U.S. Cl.
CPC ... *H04M 1/72451* (2021.01); *H04M 1/72427* (2021.01)

(58) Field of Classification Search
USPC .......................................................... 386/285
See application file for complete search history.

(56) References Cited

U.S. PATENT DOCUMENTS 9,171,404 B1 * 10/2015 Johnson ............... H04N 23/951
10,073,589 B1 * 9/2018 Jesensky .............. G06F 1/1694
(Continued)

FOREIGN PATENT DOCUMENTS

CN 108243280 A 7/2018
CN 108418972 A 8/2018
(Continued)

OTHER PUBLICATIONS

International Search Report and Written Opinion in PCT/CN2023/097846, mailed Sep. 24, 2023, 9 pages.
(Continued)

*Primary Examiner* — Nigar Chowdhury
(74) *Attorney, Agent, or Firm* — Astute IP Law Group

(57) ABSTRACT

Embodiments of the present disclosure provide a method and an apparatus for generating an imagery record, and an electronic device, and a storage medium. Being within a triggering period is detected, and at least one anniversary card is displayed on a first application interface, where the triggering period is determined based on a target anniversary corresponding to a target user; the anniversary card is triggered to display an imagery record generating page, where the imagery record generating page is used to generate template information corresponding to the anniversary card, and the template information is determined based on the target anniversary; in response to a first user instruction for the imagery record generating page, target imagery data is generated, where the first user instruction is used to acquire source imagery data, and the target imagery data is generated based on the source imagery data and the template information.

16 Claims, 12 Drawing Sheets

(56) References Cited

U.S. PATENT DOCUMENTS

| | | | | |
|---|---|---|---|---|
| 10,505,875 | B1 * | 12/2019 | Jenks | H04L 51/10 |
| 11,341,583 | B2 | 5/2022 | Schneider | |
| 11,954,420 | B2 * | 4/2024 | Behar | G06F 40/106 |
| 2005/0208927 | A1 | 9/2005 | Wong et al. | |
| 2007/0238082 | A1 * | 10/2007 | Ingrassia | G09B 23/285 434/307 A |
| 2008/0235095 | A1 * | 9/2008 | Oles | G06Q 30/0603 705/14.26 |
| 2010/0188421 | A1 * | 7/2010 | Ohwa | G06F 40/103 707/E17.014 |
| 2012/0066613 | A1 | 3/2012 | Berger | |
| 2013/0159445 | A1 * | 6/2013 | Zonka | G06Q 10/1093 709/206 |
| 2013/0254293 | A1 | 9/2013 | Reedy | |
| 2013/0266924 | A1 * | 10/2013 | Zelin | G09B 7/00 434/362 |
| 2013/0275255 | A1 * | 10/2013 | Trounce | G06Q 30/0635 705/26.5 |
| 2013/0304605 | A1 * | 11/2013 | Glass | G06Q 30/06 705/26.5 |
| 2014/0075300 | A1 * | 3/2014 | Hanson | G06F 40/174 715/255 |
| 2014/0229462 | A1 * | 8/2014 | Lo | G06F 16/9538 707/707 |
| 2014/0316920 | A1 | 10/2014 | Wolfe | |
| 2016/0034995 | A1 * | 2/2016 | Williams | G06Q 30/0631 705/26.43 |
| 2017/0061003 | A1 * | 3/2017 | Baird | G06F 16/686 |
| 2017/0083186 | A1 * | 3/2017 | Naficy | G06F 9/451 |
| 2017/0177582 | A1 * | 6/2017 | Plasmeier | G06F 16/24 |
| 2019/0245897 | A1 * | 8/2019 | Calloway | H04N 21/4223 |
| 2021/0035069 | A1 * | 2/2021 | Parikh | G06Q 10/101 |
| 2022/0327303 | A1 * | 10/2022 | Carlson | G06K 7/1434 |

FOREIGN PATENT DOCUMENTS

| | | | |
|---|---|---|---|
| CN | 110033502 | A | 7/2019 |
| CN | 110856038 | A | 2/2020 |
| CN | 112188266 | A | 1/2021 |
| CN | 112866796 | A | 5/2021 |
| CN | 112967084 | A | 6/2021 |
| CN | 113325979 | A | 8/2021 |
| CN | 113448468 | A | 9/2021 |
| CN | 114127779 | A | 3/2022 |
| CN | 115103236 | A | 9/2022 |
| EP | 2096840 | B1 | 7/2012 |
| JP | 2016167299 | A | 9/2016 |
| JP | 2017-063339 | A | 3/2017 |
| KR | 1020190038788 | A | 4/2019 |
| WO | 2021073315 | A1 | 4/2021 |

OTHER PUBLICATIONS

Office Action for Chinese Patent Application No. 202210684581.X, mailed May 11, 2024, 10 pages.

Extended European Search Report received for European Application No. 23822942.1, mailed on Jul. 23, 2025, 8 pages.

Office Action received for Brazilian Patent Application No. 112024026014-3, mailed on Sep. 2, 2025, 13 pages (6 pages of English Translation and 7 pages of Original Document).

Office Action received for Japanese Patent Application No. 2024-573449, mailed on Aug. 19, 2025, 6 pages (3 pages of English Translation and 3 pages of Original Document).

* cited by examiner

METHOD AND APPARATUS FOR GENERATING IMAGERY RECORD, ELECTRONIC DEVICE, AND STORAGE MEDIUM

CROSS-REFERENCE TO RELATED APPLICATIONS

This application claims priority to Chinese Patent Application No. 202210684581.X, filed on Jun. 16, 2022 and entitled "METHOD AND APPARATUS FOR GENERATING IMAGERY RECORD, ELECTRONIC DEVICE, AND STORAGE MEDIUM", which is hereby incorporated by reference in its entirety.

TECHNICAL FIELD

The embodiments of the present disclosure relate to the field of Internet technologies, and in particular, to a method and an apparatus for generating an imagery record, an electronic device, and a storage medium.

BACKGROUND

At present, with popularization of smart terminals and mobile networks, short video platforms have been recognized by many users for their rich content and prominent social attributes. At the same time, most of the content on a short video platform is uploaded by individual users. Therefore, the number of users who participate in uploading content determines richness of the content on the short video platform.

In the prior art, in order to improve enthusiasm of users to upload content, the operator of the short video platform will set up a corresponding guidance sign and a guidance procedure in a short video application to guide users to capture and upload an imagery record. However, solutions in the prior art have problems, such as poor guidance effect and complicated imagery data generating processes, and it is difficult to effectively guide users to capture imagery data.

SUMMARY

Embodiments of the present disclosure provide a method and an apparatus for generating an imagery record, an electronic device, and a storage medium, to solve the problems, such as poor guidance effect and complicated imagery data generating processes, during guiding a user to perform recording and capturing using an application in the prior art.

In a first aspect, an embodiment of the present disclosure provides a method for generating an imagery record, applied to a terminal device, and the method includes:

detecting being within a triggering period, and displaying at least one anniversary card on a first application interface, where the triggering period is determined based on a target anniversary corresponding to a target user;

triggering the anniversary card to display an imagery record generating page, where the imagery record generating page is used to generate template information corresponding to the anniversary card, and the template information is determined based on the target anniversary; and generating, in response to a first user instruction for the imagery record generating page, target imagery data, where the first user instruction is used to acquire source imagery data, and the target imagery data is generated based on the source imagery data and the template information.

In a second aspect, an embodiment of the present disclosure provides a method for generating an imagery record, applied to a server, and the method includes:

acquiring anniversary time information, where the anniversary time information indicates a triggering period of a target anniversary corresponding to a target user; and sending triggering information according to the anniversary time information, to display an anniversary card on a first application interface within the triggering period, where the anniversary card, after being triggered, is used to generate target imagery data corresponding to the target anniversary, and the target imagery data is combined imagery data including source imagery data and template information corresponding to the target anniversary.

In a third aspect, an embodiment of the present disclosure provides an apparatus for generating an imagery record, applied to a terminal device, including:

a displaying module, configured to detect being within a triggering period, and display at least one anniversary card on a first application interface, where the triggering period is determined based on a target anniversary corresponding to a target user;

a triggering module, configured to trigger the anniversary card to display an imagery record generating page, where the imagery record generating page is used to generate template information corresponding to the anniversary card, and the template information is determined based on the target anniversary; and a generating module, configured to, generate, in response to a first user instruction for the imagery record generating page, target imagery data, where the first user instruction is used to acquire source imagery data, and the target imagery data is generated based on the source imagery data and the template information.

In a fourth aspect, an embodiment of the present disclosure provides an apparatus for generating an imagery record, applied to a server, including:

an acquiring module, configured to acquire anniversary time information, where the anniversary time information indicates a triggering period of a target anniversary corresponding to a target user;

a transceiving module, configured to send triggering information according to the anniversary time information, to display an anniversary card on a first application interface within the triggering period, where the anniversary card, after being triggered, is used to generate target imagery data corresponding to the target anniversary, and the target imagery data is combined imagery data comprising source imagery data and template information corresponding to the target anniversary.

In a fifth aspect, an embodiment of the present disclosure provides an electronic device, including:

a processor, and a memory communicatively connected to the processor; where the memory stores a computer-executable instruction; and the processor executes the computer-executable instruction stored in the memory to implement the method for generating an imagery record according to the above first aspect and any possible designs of the first aspect, or, to implement the method for generating an imagery record according to the above second aspect and any possible designs of the second aspect.

In a sixth aspect, an embodiment of the present disclosure provides a computer-readable storage medium where the computer-readable storage medium has a computer-executable instruction stored therein, and when a processor executes the computer-executable instruction, the method for generating an imagery record according to the above first aspect and any possible designs of the first aspect, or, the method for generating an imagery record according to the above second aspect and any possible designs of the second aspect is implemented.

In a seventh aspect, an embodiment of the present disclosure provides a computer program product, including a computer program, and when the computer program is executed by a processor, the method for generating an imagery record according to the above first aspect and any possible designs of the first aspect, or, the method for generating an imagery record according to the above second aspect and any possible designs of the second aspect is implemented.

According to the method and the apparatus for generating an imagery record, the electronic device, and the storage medium, being within a triggering period is detected, and at least one anniversary card is displayed on a first application interface, where the triggering period is determined based on the target anniversary corresponding to a target user; the anniversary card is triggered to display an imagery record generating page, where the imagery record generating page is used to generate template information corresponding to the anniversary card, and the template information is determined based on the target anniversary; in response to a first user instruction for the imagery record generating page, target imagery data is generated, where the first user instruction is used to acquire source imagery data, and the target imagery data is generated based on the source imagery data and the template information. The anniversary card is displayed through an anniversary-based triggering mechanism, and target imagery data including template information matching with the target anniversary is generated by triggering the anniversary card, thereby realizing the rapid generation of personalized target imagery data. As a result, effective guidance for the user is formed on the terminal device side, the generating process of imagery data is simplified, and the efficiency of the terminal device in generating imagery data by is effectively improved.

BRIEF DESCRIPTION OF DRAWINGS

In order to describe the technical solutions in the embodiments of the present disclosure or prior art more clearly, the following will briefly introduce drawings that need to be used in the description of the embodiments or prior art. Obviously, the drawings described below are some embodiments of the present disclosure, and for those of skilled in the art, other drawings can be obtained based on these drawings without paying creative efforts.

DESCRIPTION OF EMBODIMENTS

In order to make the purpose, technical solutions and advantages of embodiments of the present disclosure clearer, the technical solutions in the embodiments of the present disclosure will be described as follows clearly and completely in conjunction with accompanying drawings in the embodiments of the present disclosure. Apparently, the described embodiments are a part rather than all of the embodiments of the present disclosure. Based on the embodiments in the present disclosure, all other embodiments acquired by those skilled in the art without creative efforts shall fall into the protection scope of the present disclosure.

Figure 1:
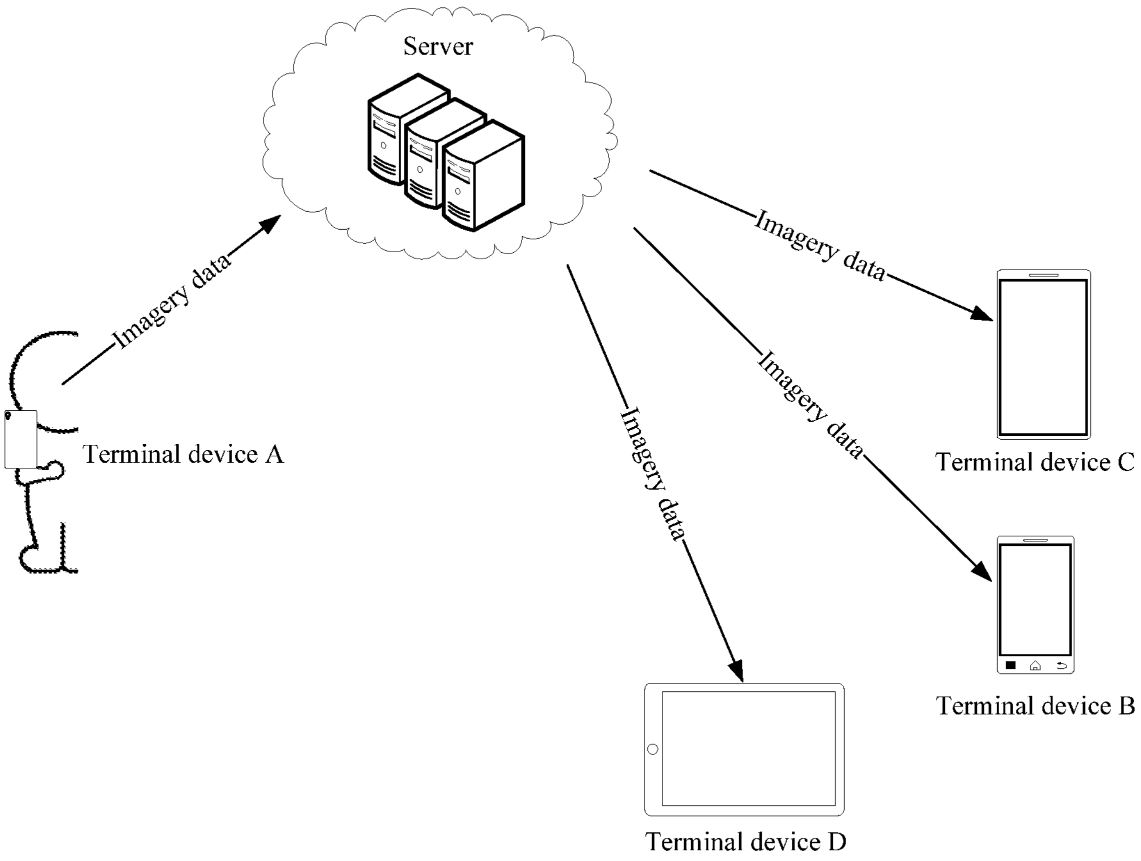
FIG. 1 is an application scenario diagram of a method for generating an imagery record according to an embodiment of the present disclosure.

The application scenarios of the embodiments of the present disclosure are explained below:

FIG. 1 is an application scenario diagram of a method for generating an imagery record according to an embodiment of the present disclosure. The method for generating an image record according to the embodiment of the present disclosure can be applied to a scenario of a short video platform. Specifically, as shown in FIG. 1, the method provided by the embodiment of the present disclosure can be applied to a terminal device, where the terminal device is, for example, a smart phone. By operating the terminal device (shown as terminal device A in the figure), a user captures a video or a photo, makes it into imagery data by adding a special effect, a background, etc., and upload the imagery data to a short video platform (server) through short video software running in the terminal device, so that other users can watch the imagery data through terminal devices (shown as terminal device B, terminal device C, and terminal device D in the figure).

The application scenario diagram shown in FIG. 1 shows a conventional way for the short video platform to acquire imagery and audio data resources, that is, user A uploads imagery and audio resources to enrich the resource library of the video platform, and user B, user C and user D watch various resources by accessing the resource library of the short video platform. Therefore, the number of users who participate in uploading content and the amount of uploaded imagery and audio data determine richness of the content on the short video platform. In the prior art, in order to improve enthusiasm of users to upload content, the operator of the short video platform will set up a corresponding guidance sign and a guidance procedure in a short video application to guide users to capture and upload an imagery record. However, in the prior art, setting a simple guidance sign and a guidance procedure in the application can hardly motivate users to capture and upload imagery records, and thus effective guidance cannot be formed. At the same time, after the source imagery data is captured, beautification and modification, such as operations of adding a background texture, background music, etc., are required to generate imagery data for uploading. Such complicated processing steps further increase the cost for users to create and upload imagery data via the terminal device, thereby reducing the enthusiasm of users.

In order to solve the above problem, in the embodiment, an anniversary card is sent to a user through an anniversary-based triggering mechanism. On the one hand, the user is more motivated to create imagery data for the anniversary, so the guidance effect becomes better. On the other hand, through the specific setting of the anniversary card, the generating step is simplified, so that the user can quickly and conveniently generate imagery data which has rich content through the terminal device, and the enthusiasm of the user to generate and upload imagery data can be further improved, thereby solving the above problems.

Figure 2:
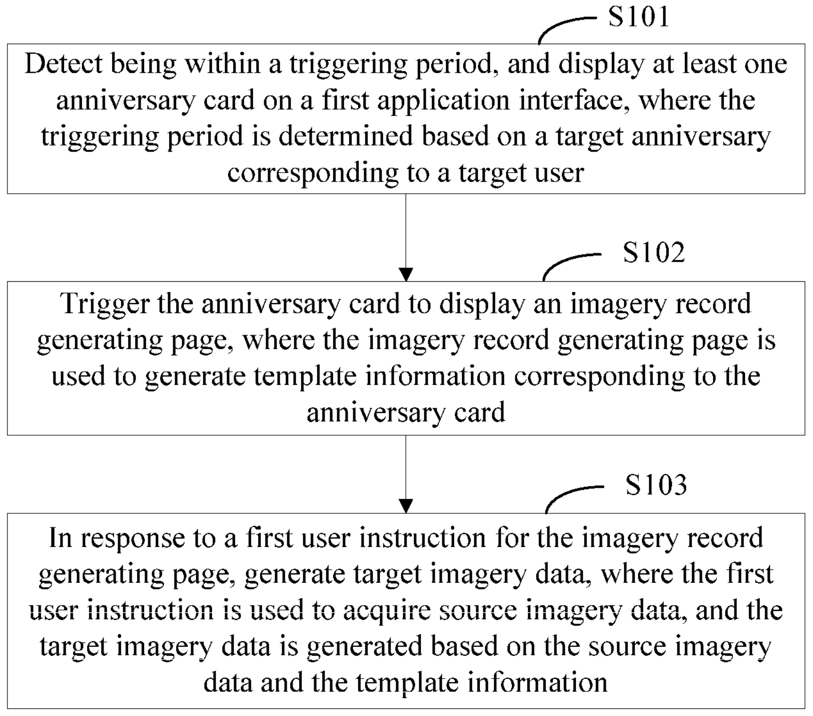
FIG. 2 is a first schematic flowchart of a method for generating an imagery record according to an embodiment of the present disclosure.

Referred to FIG. 2, FIG. 2 is a first schematic flowchart of a method for generating an imagery record according to an embodiment of the present disclosure. The method of the embodiment may be applied to a terminal device, such as a smart phone, and the method for generating an imagery record includes:

Step S101: detect being within a triggering period, and display at least one anniversary card on a first application interface, where the triggering period is determined based on a target anniversary corresponding to a target user.

Figure 3:
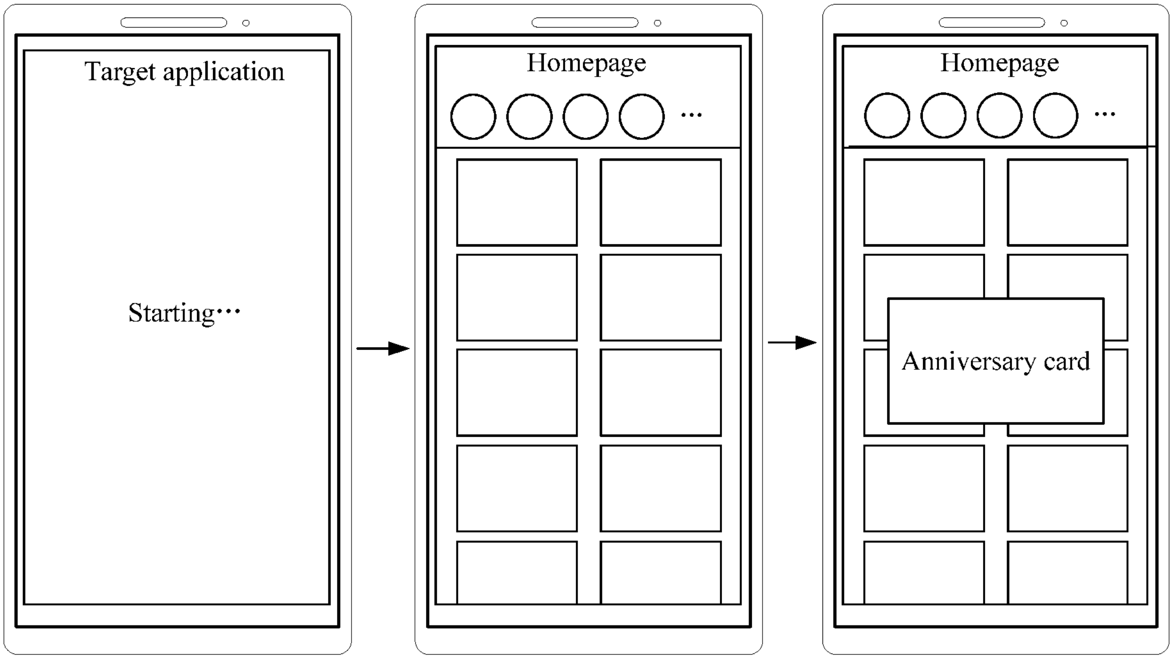
FIG. 3 is a schematic diagram of a process for displaying an anniversary card according to an embodiment of the present disclosure.

Illustratively, as an execution subject of the embodiment, a terminal device has an application (APP) for implementation of image data generation, i.e., a target application, running therein. More specifically, the target application is, for example, a short video application, a social media application, etc. The target application has a first application interface. Illustratively, taking a short video application as an example, the first application interface may be a home page, a video playback page, etc., which is not specifically limited here. After a client of the target application runs on terminal device side, the client of the target application will display at least one anniversary card on the first application interface in a specific period. FIG. 3 is a schematic diagram of a process for displaying an anniversary card according to an embodiment of the present disclosure. As shown in FIG. 3, the first application interface is a home page of a target application. After a target program runs, the home page is first loaded and displayed, and then an icon, which is the anniversary card, appears (is displayed) at the center of the home page of the target application. It should be noted that a style and position of the anniversary card shown in FIG. 3 are only illustrative, and the anniversary card may be in various shapes, such as a rectangle, a square, a circle, etc. The anniversary card may be at various positions, for example, in the center, on the top, at the bottom, etc., of the first application interface, which is not specifically limited.

Further, illustratively, the anniversary card is a triggerable component loaded on the first application interface, and the anniversary card, after being triggered, is used to implement functions of page jumping and displaying. The timing when the anniversary card is displayed on the first application interface is within the triggering period, where the triggering period is determined by a server based on the target anniversary of the target user, and the triggering time is determined based on the time when the server sends triggering information to the terminal device. Specifically, for example, the target anniversary is the birthday of user User_1, and more specifically, for example, the target anniversary is Jan. 1, 1990. The corresponding triggering period is the birthday of the user User_1, that is, from 0:00 on January 1st to 0:00 on January 2nd every year. In the time interval from 0:00 on January 1st to 0:00 on January 2nd every year, after the target application runs, based on the triggering information sent by the server to the terminal device, the terminal device displays the anniversary card on the first application interface. More specifically, the specific display timing of the anniversary card may be that the anniversary card is displayed on the first application interface immediately after the target application displays the first application interface for the first time in the triggering period; or the anniversary card is displayed at other moment when the target application displays the first application interface in the triggering period, which is not specifically limited here.

Step S102: trigger the anniversary card to display an image record generating page, where the imagery record generating page is used to generate template information corresponding to the anniversary card.

Illustratively, after displaying the anniversary card on the first application interface, the terminal device processes the anniversary card based on different triggering methods, so that a record generating module is jumped to from a current activated interface. Specifically, in a possible implementation, after the user clicks the anniversary card through a touch screen of the terminal device, the display interface of the terminal device jumps from the current first application interface to a second application interface, and an imagery record generating page is displayed on the second application interface. Alternatively, after the user clicks on the component through the touch screen of the terminal device, the imagery record generating page is displayed above the first application interface. In another possible implementation, after a preset time, the anniversary card is automatically triggered (that is, not being canceled within a preset time is automatically regarded as the anniversary card being clicked), so that the display interface of the terminal device jumps from the current first application interface to the second application interface, and the imagery record generating page is displayed on the second application interface, or the imagery record generating page is displayed above the first application interface.

Further, the imagery record generating page will be introduced below. Illustratively, the imagery record generating page is a page which is used to generate template information related to the target anniversary, and the imagery record generating page is provided with an operation component. A corresponding processing method can be called by operation on the operation component on the imagery record generating page, to generate template information, or set a characteristic of the template information. The template information may be background information indicating a background of the anniversary card, and more specifically, the template information may be, for example, one or more of a background image, a background special effect, background music, a transition mode, or a camera movement direction. The template information may be displayed in the imagery record generating page in a form of preview.

Figure 4:
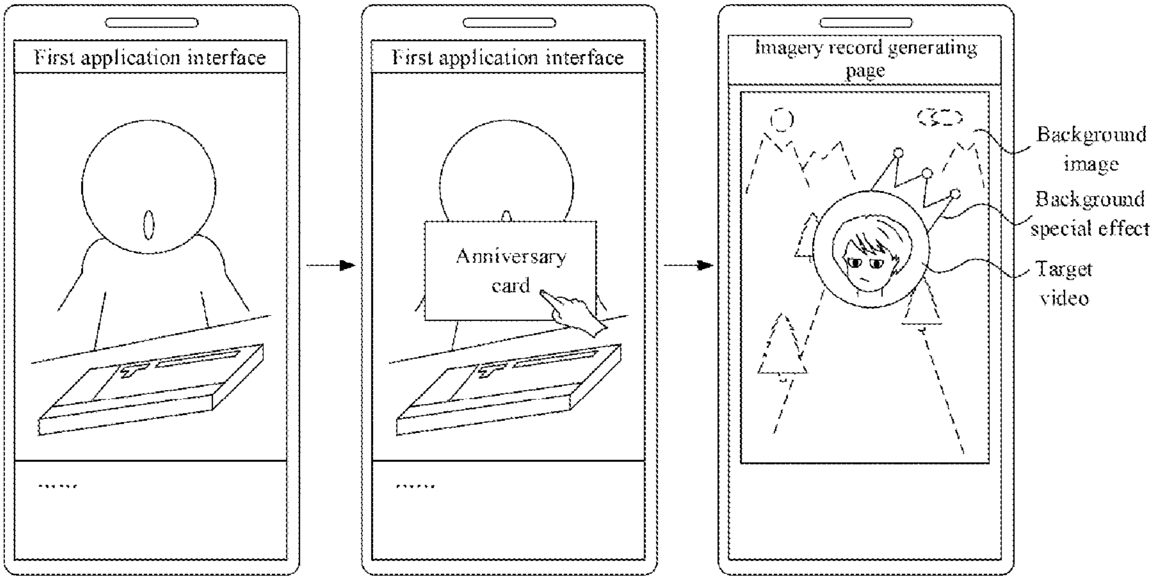
FIG. 4 is a schematic diagram of displaying an imagery record generating page according to an embodiment of the present disclosure.

FIG. 4 is a schematic diagram of displaying an imagery record generating page according to an embodiment of the present disclosure. As shown in FIG. 4, the first application interface is a short video playback interface. After the anniversary card appears on the first application interface, in response to a click operation by the user, the anniversary card is triggered, and the current display interface of the terminal device jumps from the video playback interface to the imagery record generating page (the second application interface). At the same time, the background image and the background special effect are displayed in the imagery record generating page, and the background music has been set synchronously (not shown in the figure). At the same time, the imagery record generating page also includes a region for displaying source imagery and audio data (shown as the target video in the figure), and through the content displayed on the imagery record generating page, a preview of the subsequently generated target imagery data can be realized.

Step S103: in response to a first user instruction for the imagery record generating page, generate target imagery data, where the first user instruction is used to acquire source imagery data, and the target imagery data is generated based on the source imagery data and the template information.

Further, after jumping to the imagery record generating page, the terminal device receives a first user instruction and obtains source imagery data, where the source imagery data is, for example, a video or a picture saved in the terminal device locally or save in a cloud server (in this case, the first user instruction is equivalent to a file reading instruction), or a video or a picture captured by a camera in real time (in this case, the first user instruction is equivalent to a camera capturing instruction). After that, the source imagery data is combined with the template information of the imagery record generating page, and then the combined imagery data with rich template information, i.e., the target imagery data, can be obtained.

Figure 5:
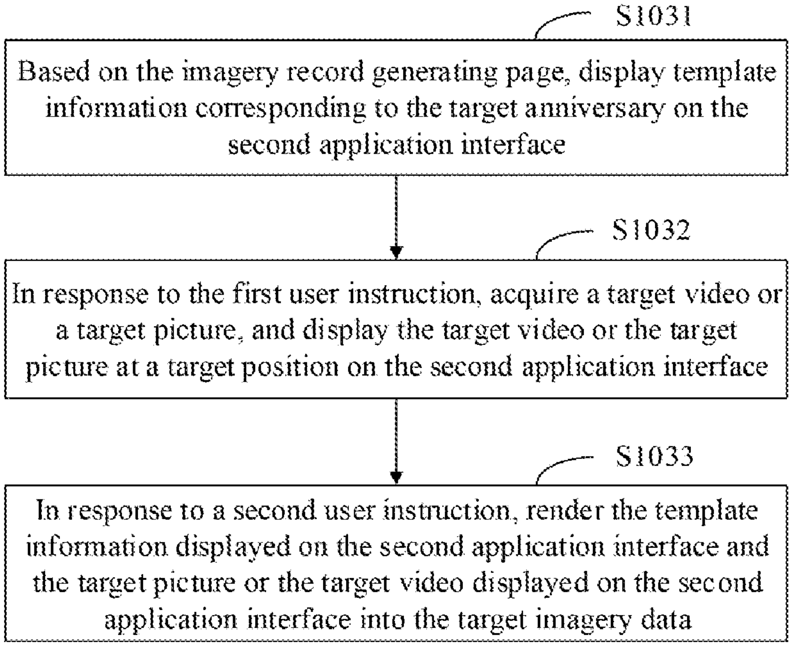
FIG. 5 is a flowchart of steps of a specific implementation for step S103 in the embodiment shown in FIG. 2.

In a possible implementation, the imagery record generating page is displayed on a second application interface. As shown in FIG. 5, steps of a specific implementation for step S103 include:

Step S1031: based on the imagery record generating page, display template information corresponding to the target anniversary on the second application interface.

Step S1032: in response to the first user instruction, acquire a target video or a target picture, and display the target video or the target picture at a target position on the second application interface.

Step S1033: in response to a second user instruction, render the template information displayed on the second application interface and the target picture or the target video displayed on the second application interface into the target imagery data.

Figure 6:
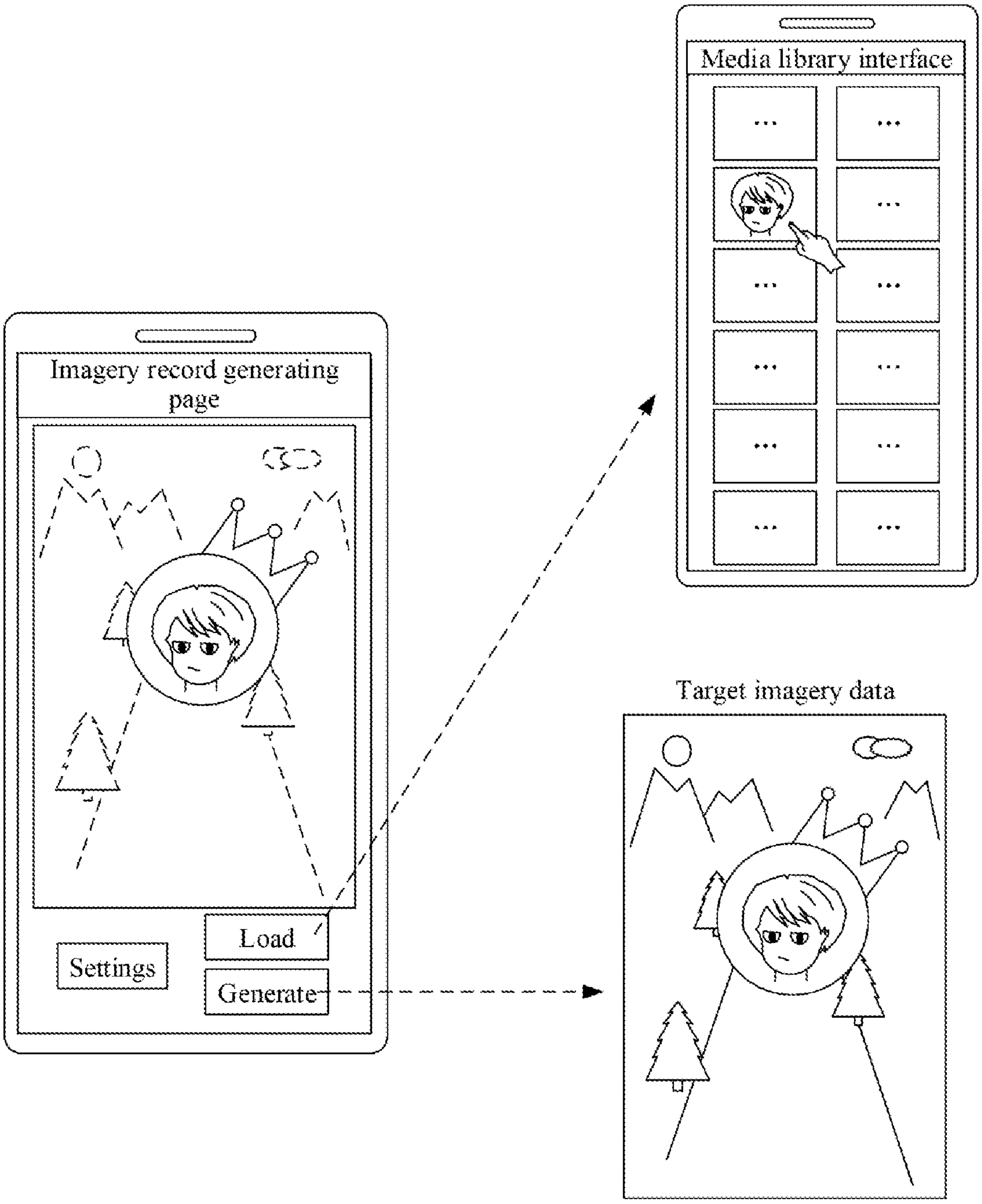
FIG. 6 is a schematic diagram of generating target imagery data according to an embodiment of the present disclosure.

FIG. 6 is a schematic diagram of generating target imagery data according to an embodiment of the present disclosure, and the above process is described in detail with reference to FIG. 6. As shown in FIG. 6, illustratively, based on the triggering of the anniversary card, the terminal device displays an imagery record generating page on the second application interface, where a preview image of a background image and a background special effect is displayed on the imagery record generating page. Meanwhile, the imagery record generating page is provided with a "Load" component for selecting source imagery data, and a "Generate" component for generating final combined imagery data synthesized from the source imagery data and the template information. Then, after the loading component is clicked, the terminal device displays a media library interface, and then a target video is clicked to be selected on the media library interface (the two instructions of clicking the loading component and clicking the target video to select are together taken as the first user instruction), and the target video is loaded at the target position on the second application interface. After that, the generating component is clicked, and the target video, a background picture, and the background image are rendered into combined imagery data, i.e., target imagery data. Optionally, the imagery record generating page further includes a "Settings" component. By triggering the settings component, configuration parameters of the imagery record generating page can be modified, thereby realizing the change of template information, such as the background image, the background effect, and the background music.

In the embodiment, the target application runs, and the anniversary card is displayed on the first application interface within the triggering period, where the triggering period is determined based on the target anniversary corresponding to the target user; the anniversary card is triggered, and the imagery record generating page is jumped to, where the imagery record generating page is used to generate template information corresponding to the target anniversary; in response to the first user instruction for the imagery record generating page, the target imagery data is generated, where the first user instruction is used to acquire the source imagery data, and the target imagery data is the combined imagery data including the source imagery data and the template information. The anniversary card is displayed in the target application through an anniversary-based triggering mechanism, and the target imagery data including template information matching with the target anniversary is generated by triggering the anniversary card, thereby realizing the rapid generation of personalized target imagery data. As a result, effective guidance for the user is formed on the terminal device side, the generating process of imagery data is simplified, and the efficiency of the terminal device in generating imagery data is effectively improved.

Figure 7A:
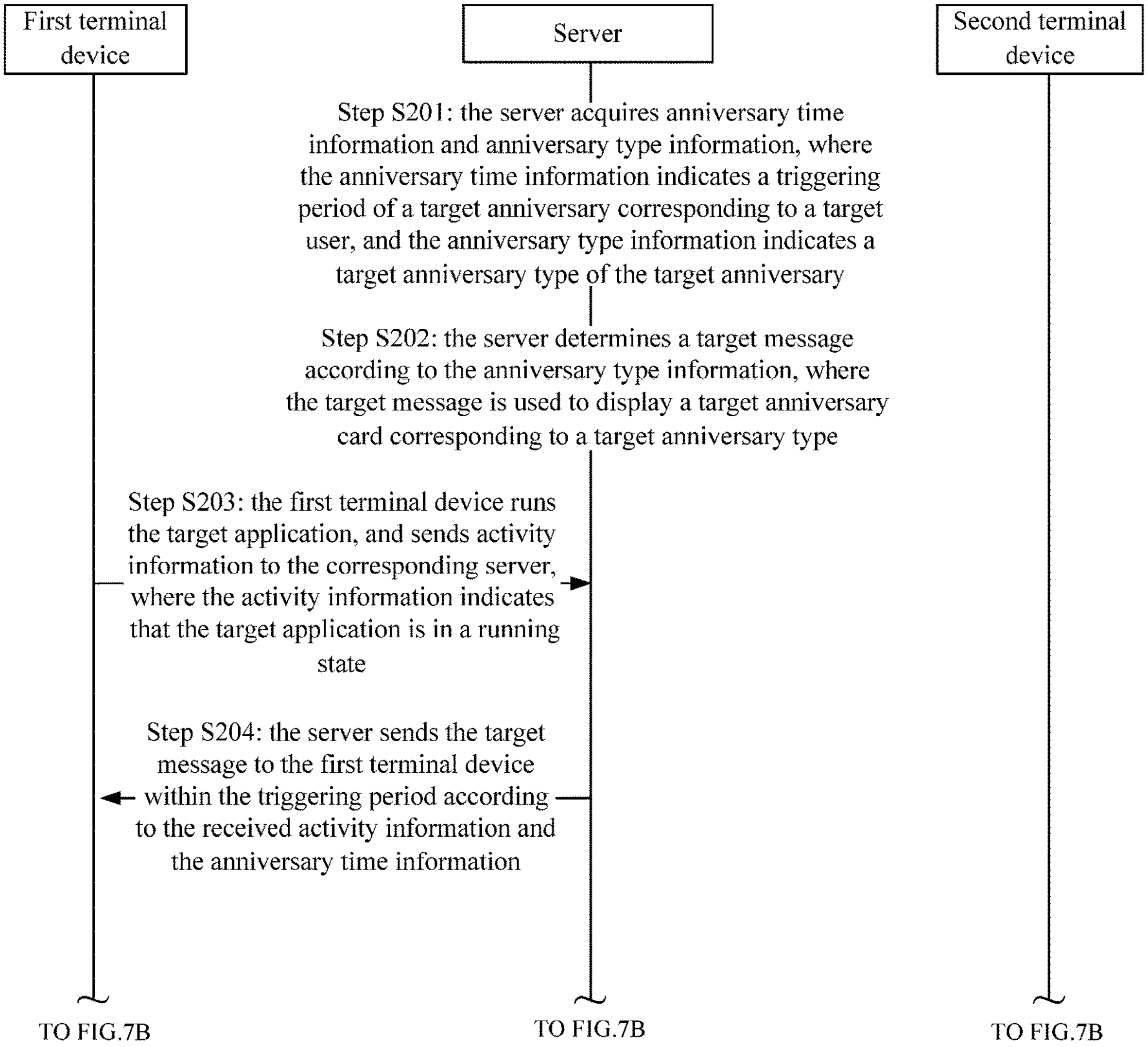
FIG. 7A and FIG. 7B are schematic flowcharts of signaling interaction of a method for generating an imagery record according to an embodiment of the present disclosure.
Figure 7B:
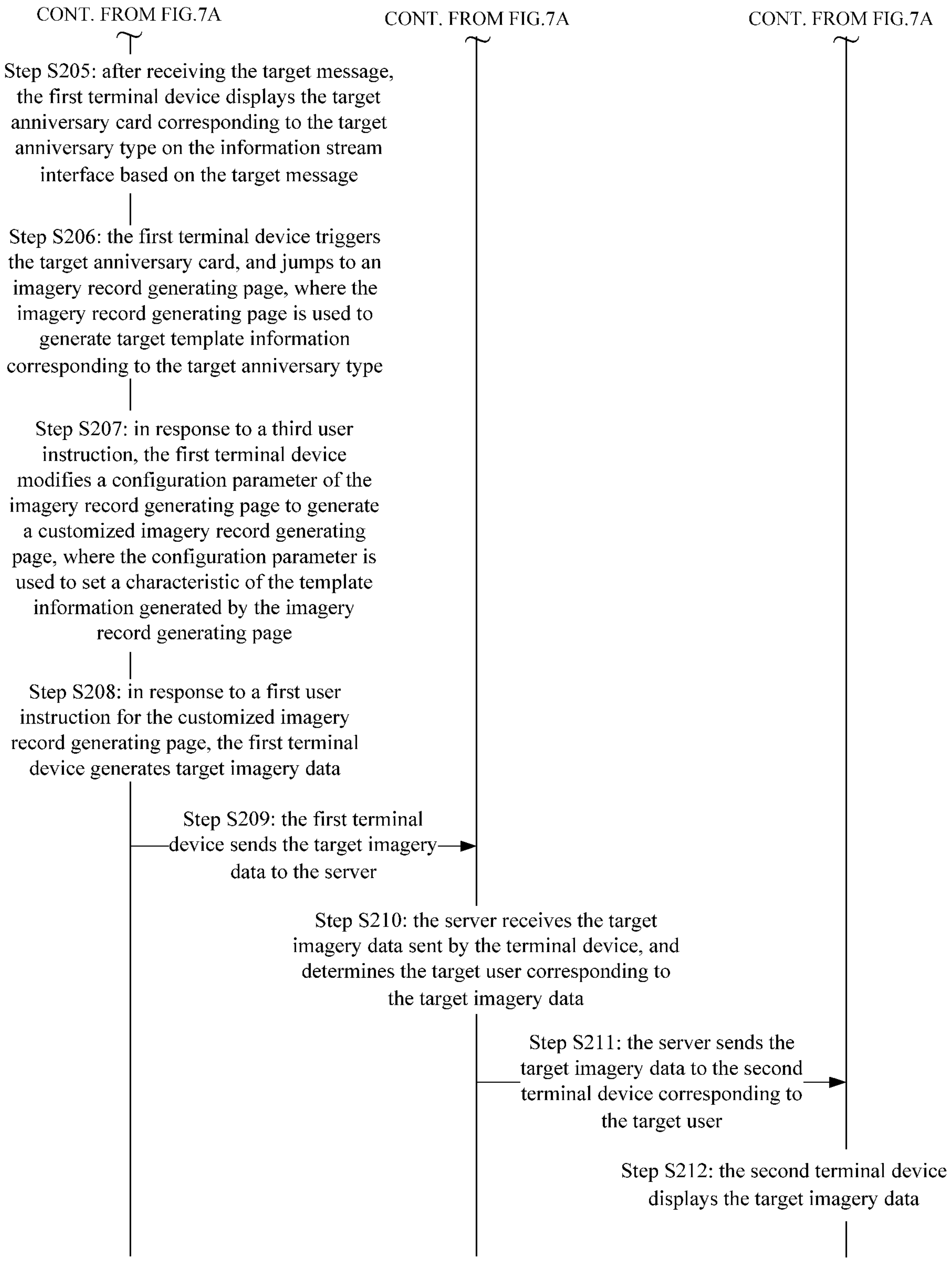

FIG. 7A and FIG. 7B are schematic flowcharts of signaling interaction of a method for generating an imagery record according to an embodiment of the present disclosure. Referring to FIG. 7A and FIG. 7B, based on the embodiment shown in FIG. 2, and in conjunction with an interaction process between a server and a terminal device (shown as a first terminal device in the embodiment), the embodiment is further refined. The method for generating an imagery record includes:

Step S201: a server acquires anniversary time information and anniversary type information, where the anniversary time information indicates a triggering period of a target anniversary corresponding to a target user, and the anniversary type information indicates a target anniversary type of the target anniversary.

Step S202: the server determines a target message according to the anniversary type information, where the target message is used to display a target anniversary card corresponding to the target anniversary type.

Illustratively, the server is the server corresponding to the target application in the embodiment shown in FIG. 2, that is, the serving end of the target application. The server obtains the anniversary type information and corresponding anniversary time information based on user information, such as the user's date of birth, wedding date, graduation date, etc., filled in by the target user when registering. For example, for a target user User_1, the anniversary type indicated by the anniversary type information includes, for example, any of the following: birthday, wedding anniversary, graduation anniversary, and accordingly, illustratively, the anniversary time information corresponding to the birthday is January 1st, the anniversary time information corresponding to the wedding anniversary is February 1st, and the anniversary time information corresponding to the graduation anniversary is July 10th. Further, the anniversary type information may be further refined for the anniversary type information, for example, a one-year-old birthday, a ten-years-old birthday, etc. Correspondingly, based on retained information, the server can obtain the corresponding anniversary time information, for example, Jan. 1, 2017 or Jan. 1, 2027. For the specific implementation scheme, reference can be made to the prior art, and details will not be detailed here.

Illustratively, an information stream in the embodiment is a Feed stream. The Feed stream combines several information sources to which a user actively subscribes, to form a content aggregator, to help the user to continuously acquire the latest content of the subscribed sources. In the embodiment, a message in the information stream refers to a piece of content in the Feed stream, where a message used to display the target anniversary card corresponding to the target anniversary type is the target message. After obtaining the anniversary type information, the server may obtain a corresponding target message based on the anniversary type information and a preset template.

Step S203: the first terminal device runs the target application, and sends activity information to the corresponding server, where the activity information indicates that the target application is in a running state.

Step S204: the server sends the target message to the first terminal device within the triggering period according to the received activity information and the anniversary time information.

Step S205: after receiving the target message, the first terminal device displays the target anniversary card corresponding to the target anniversary type on the information stream interface based on the target message.

Illustratively, after the first terminal device runs the target application, it will send activity information to the server to inform the server that it is in an active state, and thereafter, the server will provide the first terminal device with an information stream. In a possible implementation, the server determines according to the anniversary time information that it is currently within the triggering period, and after receiving the activity information, the server adds the target message to the information stream for the information stream of the first terminal device. As messages in the information stream of the first terminal device are continuously subscribed and pulled by the first terminal device, the target message is sent to the first terminal device, so that the first terminal device side can display the target anniversary card.

Figure 8:
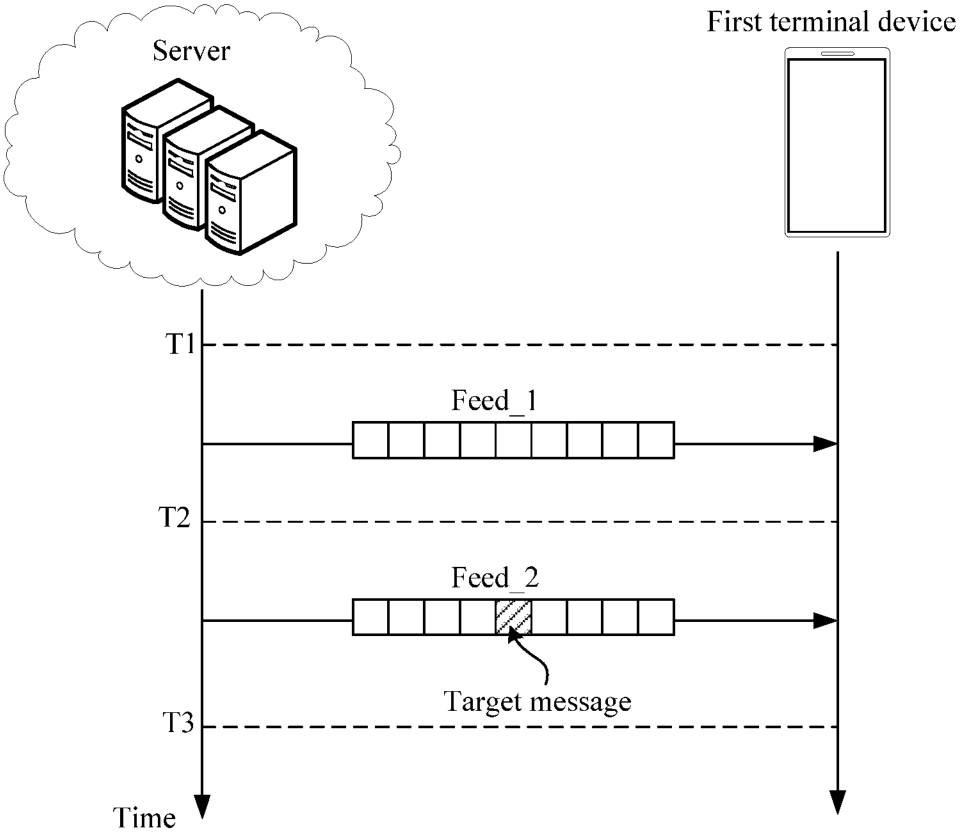
FIG. 8 is a schematic diagram of a process in which a server sends a target message to a first terminal device according to an embodiment of the present disclosure.

FIG. 8 is a schematic diagram of a process in which a server sends a target message to a first terminal device according to an embodiment of the present disclosure. As shown in FIG. 8, the period from T1 to T2 is a non-triggering period, and the period from T2 to T3 is a triggering period. When the first terminal device runs the target application within the period from T1 to T2, the server provides the first terminal device with a common Feed stream (shown as Feed_1 in the figure). When the first terminal device runs the target application within the period from T2 to T3, the server provides the first terminal device with a Feed stream (shown as Feed_2 in the figure) that includes the target message, so that the first terminal device can obtain the target message in the process of the feed stream being refreshed.

Figure 9:
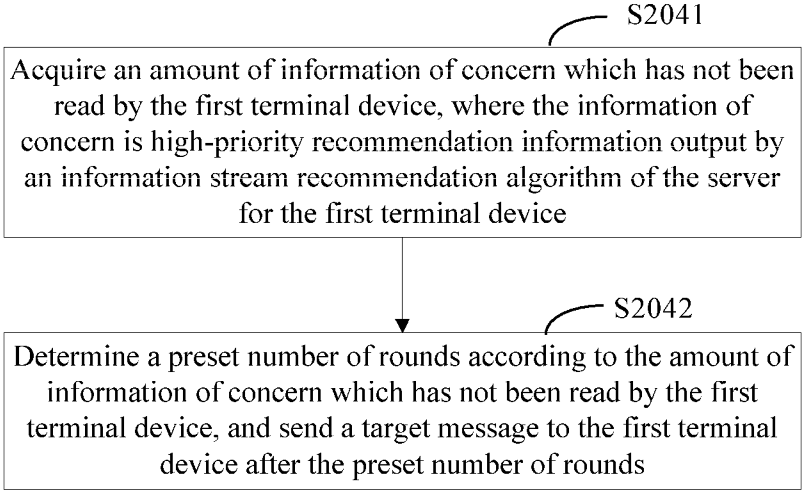
FIG. 9 is a flowchart of steps of a possible implementation for step S204.

Illustratively, FIG. 9 is a flowchart of steps of a possible implementation for step S204, as shown in FIG. 9, including:

step S2041: acquire an amount of information of concern which has not been read by the first terminal device, where the information of concern is high-priority recommendation information output by an information stream recommendation algorithm of the server for the first terminal device;

step S2042: determine a preset number of rounds according to the amount of information of concern which has not been read by the first terminal device, and send a target message to the first terminal device after the preset number of rounds.

Illustratively, the server generates recommendation information for the first terminal device by means of an information stream recommendation algorithm, and continuously sends the recommendation information to the first terminal device in the form of an information stream (Feed stream). In this process, taking the application scenario of a short video platform or a social media platform as an example, the information stream recommendation algorithm will give priority to outputting information that the user is predicted to be interested in, such as activity information posted by friends, breaking news, news about hot topics, etc., that is, high-priority recommendation information, and the information stream recommendation algorithm in the server recommends other information after such high-priority recommendation information has been output.

In the steps of the embodiment, the purpose of sending the target message by the first terminal device is to guide the user to generate imagery data, and in order to avoid affecting the user's acquisition of information of high concern, the server first acquires the amount of information of concern which has not been read by the first terminal device, and determines the preset number of rounds based on the amount of information of concern that has not been read, and the first terminal device initiates a request to the server in each round to acquire a feed stream in turn. Therefore, by sending the target message to the first terminal device after the preset number of rounds, it can be ensured that the user on the first terminal device side has read and watched (all or most of) the information the user is concerned with. Thus, it is avoided that the user on the first terminal device side has low willingness to trigger the anniversary card due to the need to watch the information of concern, thereby improving the user's willingness to create target imagery data and improving the guidance effect.

Figure 10:
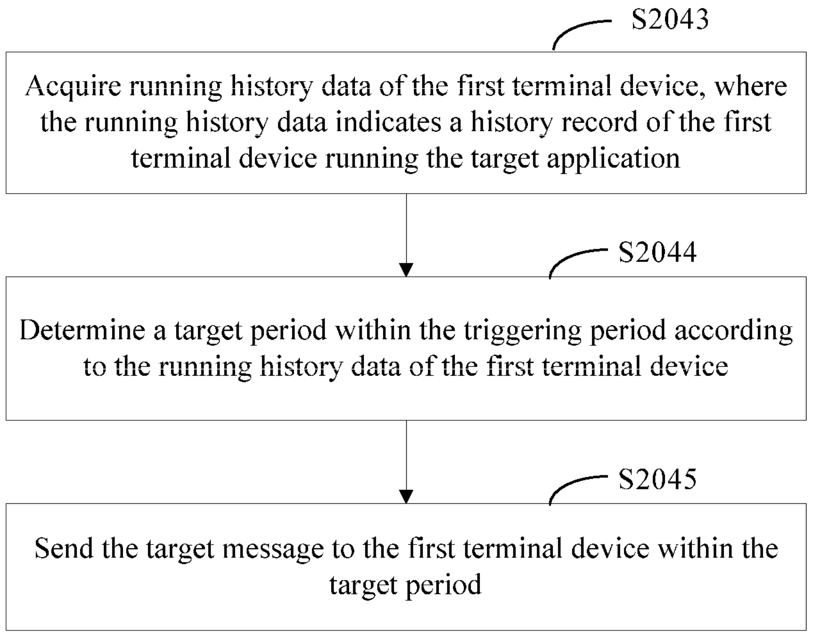
FIG. 10 is a flowchart of steps of another possible implementation for step S204.

Illustratively, FIG. 10 is a flowchart of steps of another possible implementation for step S204, including:

step S2043: acquire running history data of the first terminal device, where the running history data indicates a history record of the first terminal device running the target application;

step S2044: determine a target period within the triggering period according to the running history data of the first terminal device; and step S2045: send the target message to the first terminal device within the target period.

Illustratively, the running history data of the first terminal device indicates the history record of the first terminal device running the target application. In a possible implementation, the running history data includes start time and end time of using the target application by the first terminal device on historical dates. Based on a distribution of the running time recorded by the running history data, idle time of the first terminal device (that is, the time when the target application is frequently used, more specifically, for example, from 20:00 to 22:00 every day) and non-idle time (that is, the time when the target application is not used frequently, more specifically, for example, from 0:00 to 8:00 every day) may be determined. Further, based on the idle time and the non-idle time of the first terminal device, a target period is determined within the triggering period, for example, from 20:00 to 22:00 pm on August 1st (illustratively, corresponding to the target user's wedding anniversary).

In the steps of the embodiment, the purpose of sending the target message by the first terminal device is to guide the user to generate imagery data, and in order to better improve the enthusiasm of the user, a target period is determined within the triggering period according to the running history data, and the target message is sent to the first terminal device within the target period, so that the operating user on the first terminal device side can trigger the target anniversary card in idle time, thereby further improving the user's enthusiasm for creating target imagery data.

Figure 11:
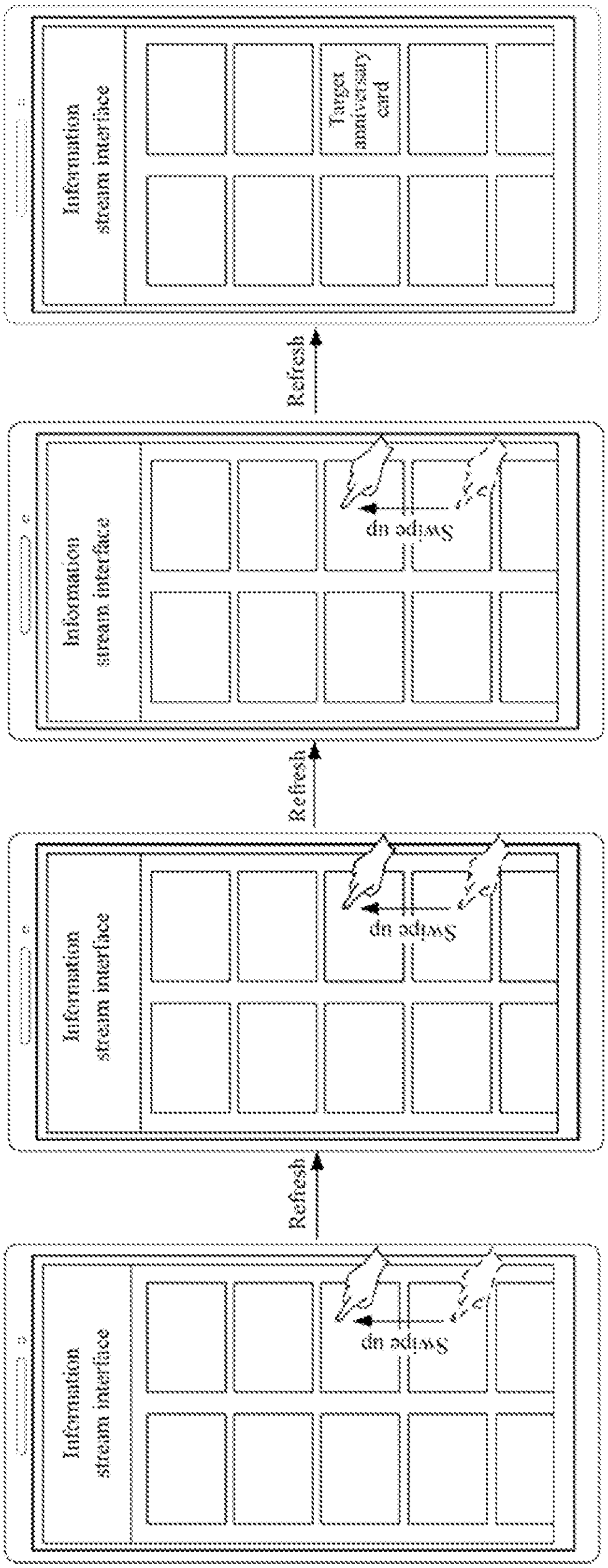
FIG. 11 is a schematic diagram of displaying an anniversary card on an information stream interface according to an embodiment of the present disclosure.

FIG. 11 is a schematic diagram of displaying an anniversary card on an information stream interface according to an embodiment of the present disclosure. The above process is further described with reference to FIG. 11. The first terminal device is, for example, a smart phone, and the target application running on the smart phone is a piece of social media software using information stream technology. The target application continuously displays information to the user through an information stream interface, and specifically, the information includes video, text, picture, etc. The user continually refreshes the content on the information stream interface by operating the terminal device, for example, through a "swiping up" operation. After each refresh, a new message will be obtained from the server and displayed on the information stream interface. After "swiping up" N times, the server sends the target message to the first terminal device, and then, an anniversary card corresponding to the target message appears on the information stream interface of the first terminal device. Specifically, as shown in the figure, after each time of swiping up, a new message appears on the information stream interface, and after "swiping up" three times, the target anniversary card corresponding to the target message appears on the information stream interface of the first terminal device. The "swiping up" operation is only an illustrative manner to trigger the refresh of the information stream, and the required number of refresh rounds N for displaying the anniversary card may also be implemented in various ways. For example, N may be 0, that is, the anniversary card appears on the home page of the target application, or N may be 2, 3, 4, etc., that is, the anniversary card appears after swiping several times. The specific value of N may be determined by the method shown in FIG. 9 or FIG. 10, which will not be repeated here.

Step S206: the first terminal device triggers the target anniversary card, and jumps to an imagery record generating page, where the imagery record generating page is used to generate target template information corresponding to the target anniversary type.

Step S207: in response to a third user instruction, the first terminal device modifies a configuration parameter of the imagery record generating page to generate a customized imagery record generating page, where the configuration parameter is used to set a characteristic of the template information generated by the imagery record generating page.

Step S208: in response to a first user instruction for the customized imagery record generating page, the first terminal device generates target imagery data.

Further, in a possible implementation, after the target anniversary card is triggered through a click operation, the first terminal device will jump to the imagery record generating page to display and generate the target template information corresponding to the target anniversary type, such as a background image, a background special effect, or background music, that match with the target anniversary type, thereby achieving the purpose of automatically and quickly generating target imagery data matching with the target anniversary type, and simplifying the process of creating imagery data.

In another possible implementation, the background image, the background special effect, the background music, etc., included in the target template information may all be adjusted based on user preference. Specifically, configuration parameters of the imagery record generating page are modified based on the response to the third user instruction, for example, changing the background image, the background special effect, the background music, etc., (that is, the characteristics of the template information), thereby generating a customized imagery record generating page, so that the template information further generated by the customized imagery record generating page can be more rich and diverse, and the generated target imagery data can meet the personalized needs of the user.

Step S209: the first terminal device sends the target imagery data to the server.

Step S210: the server receives the target imagery data sent by the terminal device, and determines the target user corresponding to the target imagery data.

Step S211: the server sends the target imagery data to a second terminal device corresponding to the target user.

Step S212: the second terminal device displays the target imagery data.

Further, after the first terminal device generates the target imagery data, the target imagery data is uploaded to the server, specifically, such as a social media platform. The target imagery data is an imagery record for the target anniversary of the target user. More specifically, for example, the user corresponding to the first terminal device is User_1, and the target user is User_2. The target imagery data is an imagery and audio record created by User_1 for celebrating the birthday or wedding anniversary of User_2. User_1 creates the target imagery data based on the guidance of the steps provided in the above-mentioned embodiments, and then, uploads the target imagery data to the server. After that, the server adds the target imagery data to the information stream of User_2. When User_2 runs the target application through a second terminal device (it should be noted that the target application running on the second terminal device may be the same as or different from the target application running when the first terminal device generates the target imagery data), the target imagery data sent by the server will be received and be displayed and played during the refresh of the information stream, thereby realizing a social process of multi-terminal interaction which is based on the anniversary triggering mechanism, improving the enthusiasm and interactivity of the user in creating imagery and audio data, and improving use experience of the user.

In the embodiment, the implementation and technical effect of step S206 are consistent with those of step S102 in the above-mentioned embodiment, and for the detailed discussion, reference can be made to the discussion of step S102, which will not be repeated here.

Figure 12:
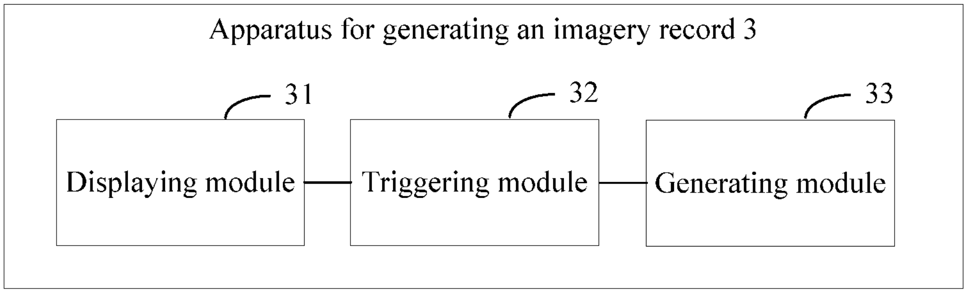
FIG. 12 is a structural block diagram of an apparatus for generating an imagery record according to an embodiment of the present disclosure.

Corresponding to the steps performed by the terminal device in the method for generating an imagery record according to the above embodiments, FIG. 12 is a structural block diagram of an apparatus for generating an imagery record provided by an embodiment of the present disclosure. For convenience of description, only the parts related to the embodiments of the present disclosure are shown. Referred to FIG. 12, the apparatus for generating an imagery record 3 includes:

a displaying module 31, configured to run a target application, and display an anniversary card on a first application interface within a triggering period, where the triggering period is determined based on a target anniversary corresponding to a target user;

a triggering module 32, configured to trigger the anniversary card, and jump to an imagery record generating page, where the imagery record generating page is used to generate template information corresponding to the target anniversary; and a generating module 33, configured to generate, in response to a first user instruction for the imagery record generating page, target imagery data, where the first user instruction is used to acquire source imagery data, and the target imagery data is combined imagery data including the source imagery data and the template information.

In an embodiment of the present disclosure, the first application interface is an information stream interface, and the displaying module 31 is specifically configured to: run the target application and send activity information to a corresponding server, where the activity information indicates that the target application is in a running state; receive a target message sent by the server within the triggering period; and display the anniversary card on the information stream interface based on the target message.

In an embodiment of the present disclosure, when receiving the target message sent by the server within the triggering period, the displaying module 31 is specifically configured to: receive, within the triggering period and after the information stream interface is refreshed for a preset number of rounds, the target message sent by the server.

In an embodiment of the present disclosure, the preset number of rounds is determined based on an amount of information of concern, which has not been read, corresponding to the terminal device, and the information of concern is high-priority recommendation information output by an information stream recommendation algorithm of the server for the terminal device.

In an embodiment of the present disclosure, when receiving the target message sent by the server within the triggering period, the displaying module 31 is specifically configured to: receive the target message sent by the server within a target period of the triggering period, where the target period is determined based on running history data of the terminal device, and the running history data indicates a history record of the terminal device running the target application.

In an embodiment of the present disclosure, when displaying the anniversary card on the first application interface, the displaying module 31 is specifically configured to: display a target anniversary card corresponding to a target anniversary type on the first application interface, where the target anniversary type indicates a type of the target anniversary.

In an embodiment of the present disclosure, the template information includes at least one of the following:

a background image, a background special effect, or background music.

In an embodiment of the present disclosure, the source imagery data includes a video or a picture, and the imagery record generating page is displayed on a second application interface, and the generating module 33 is specifically configured to: display the template information corresponding to the target anniversary on the second application interface based on the imagery record generating page; in response to the first user instruction, acquire a target video or a target picture, and display the target video or the target picture at a target position on the second application interface; and in response to a second user instruction, render the template information displayed on the second application interface and the target picture or the target video displayed on the second application interface into the target imagery data.

In an embodiment of the present disclosure, before generating, in response to the first user instruction for the imagery record generating page, the target imagery data, the generating module 33 is further configured to: in response to a third user instruction, modify a configuration parameter of the imagery record generating page, where the configuration parameter is used to set a characteristic of template information generated by the imagery record generating page.

In an embodiment of the present disclosure, after generating the target imagery data, the generating module 33 is further configured to: send the target imagery data to the server, so that the target imagery data is sent to a terminal device corresponding to the target user.

The displaying module 31, the triggering module 32 and the generating module 33 are connected in sequence. The apparatus for generating an imagery record 3 provided in the embodiments can implement the technical solutions executed by the terminal device in the foregoing method embodiments, and the implementation principles and technical effects thereof are similar, which will not be repeated here in this embodiment.

Figure 13:
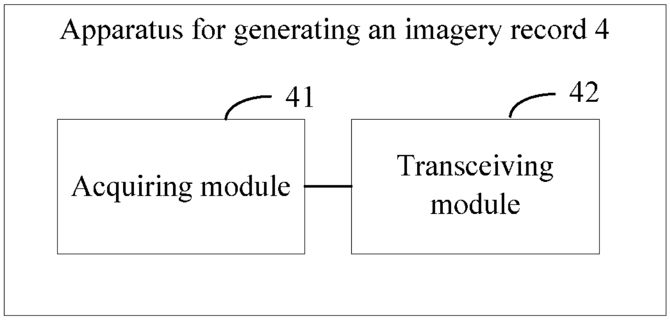
FIG. 13 is a structural block diagram of another apparatus for generating an imagery record according to an embodiment of the present disclosure.

Corresponding to the steps performed by the server in the method for generating an imagery record according to the above embodiments, FIG. 13 is a structural block diagram of another apparatus for generating an imagery record provided by an embodiment of the present disclosure. For convenience of description, only the parts related to the embodiments of the present disclosure are shown. Referred to FIG. 13, the apparatus for generating an imagery record 4 includes:

an acquiring module 41, configured to acquire anniversary time information, where the anniversary time information indicates a triggering period of a target anniversary corresponding to a target user;

a transceiving module 42, configured to send triggering information to at least one terminal device according to the anniversary time information, to cause the terminal device to display an anniversary card on a first application interface within the triggering period, where the anniversary card, after being triggered, is used to generate target imagery data corresponding to the target anniversary, and the target imagery data is combined imagery data comprising source imagery data and template information corresponding to the target anniversary.

In an embodiment of the present disclosure, the transceiving module 42 is further configured to: receive the target imagery data sent by the terminal device; and send the target imagery data to a terminal device of the target user.

Figure 14:
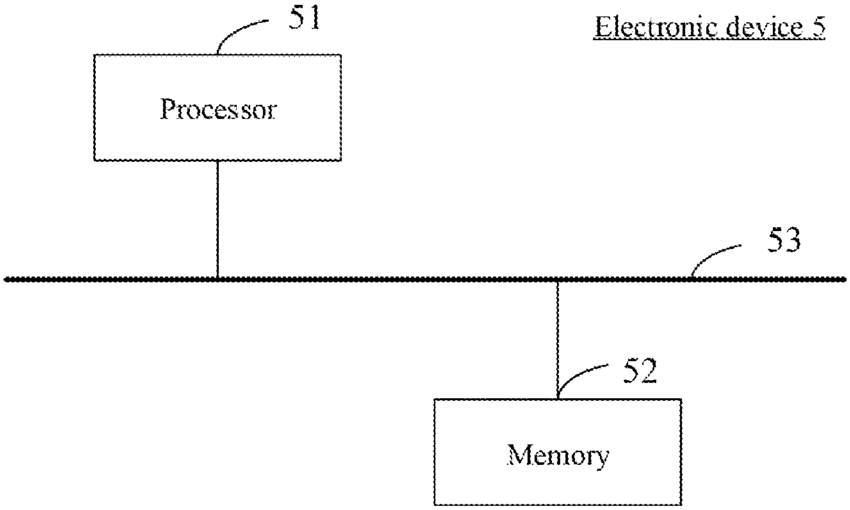
FIG. 14 is a schematic structural diagram of an electronic device according to an embodiment of the present disclosure.

FIG. 14 is a schematic structural diagram of an electronic device according to an embodiment of the present disclosure. As shown in FIG. 14, the electronic device 5 includes:

a processor 51, and a memory 52 communicatively connected to the processor 51;

where the memory 52 stores a computer-executable instruction; and the processor 51 executes the computer-executed instruction stored in the memory 52 to implement the method for generating an imagery record according to the embodiments shown in FIG. 2 to FIG. 11.

Optionally, the processor 51 and the memory 52 may be connected through a bus 53.

The relevant description can be understood by referring to the relevant descriptions and effects corresponding to the steps in the embodiments corresponding to FIG. 2 to FIG. 11, and details will not be repeated here.

Figure 15:
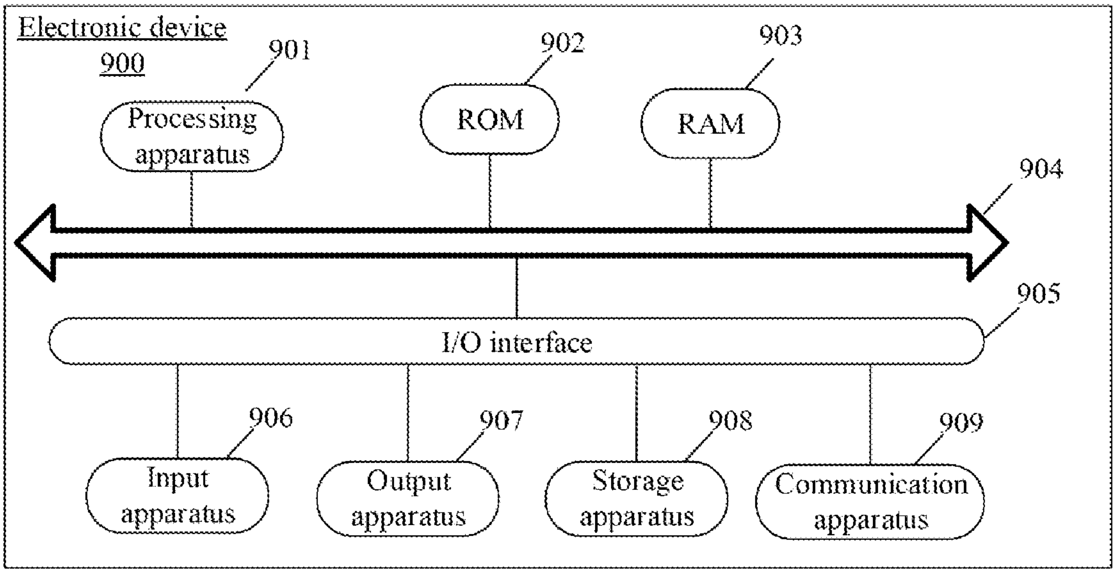
FIG. 15 is a schematic diagram of hardware structure of an electronic device according to an embodiment of the present disclosure.

Referred to FIG. 15, which shows a schematic structural diagram of an electronic device 900 adaptable to implementing the embodiments of the present disclosure. The electronic device 900 may be a terminal device or a server. The terminal device may include, but is not limited to, a mobile terminal, such as a mobile phone, a notebook computer, a digital broadcast receiver, a personal digital assistant (PDA), a portable android device (PAD), a portable media player (PMP), an on-vehicle terminal (for example, a vehicle navigation terminal), and a fixed terminal, such as a digital TV, a desktop computer. The electronic device shown in FIG. 15 is only an example, and should not bring any limitation to the function and scope of use for the embodiments of the present disclosure.

As shown in FIG. 15, the electronic device 900 may include a processing apparatus (such as a central processing unit, a graphics processor) 901, which may execute various suitable actions and processing according to programs stored in a read-only memory (ROM) 902 or programs loaded into a random access memory (RAM) 903 from a storage apparatus 908. In the RAM 903, various programs and data required for the operation of the electronic device 900 are also stored. The processing apparatus 901, the ROM 908, and the RAM 903 are connected to each other through a bus 904. An input/output (I/O) interface 905 is also connected to the bus 904.

Generally, the following devices may be connected to the I/O interface 905: an input apparatus 906, including, for example, a touch screen, a touch pad, a keyboard, a mouse, a camera, a microphone, an accelerometer, a gyroscope, etc.; an output apparatus 907, including, for example, a liquid crystal display (LCD), a speaker, a vibrator, etc.; a storage apparatus 908, including, for example, a magnetic tape, a hard disk, etc.; and a communication device 909. The communication apparatus 909 may allow the electronic apparatus 900 to perform wireless or wired communication with other devices to exchange data. Although FIG. 15 shows the electronic device 900 with multiple kinds of apparatuses, it should be understood that not all the apparatuses are required to be implemented or provided. Alternatively, more or fewer apparatuses may be implemented or provided.

In particular, according to an embodiment of the present disclosure, the processes described above with reference to the flowcharts may be implemented as a computer software program. For example, an embodiment of the present disclosure includes a computer program product, which includes a computer program carried on a computer-readable medium, and the computer program contains program code for executing the method shown in the flowchart. In such an embodiment, the computer program may be downloaded and installed from a network through the communication apparatus 909, or installed from the storage apparatus 908, or installed from the ROM 902. When the computer program is executed by the processing apparatus 901, the above-mentioned functions defined in the method of the embodiment of the present disclosure are executed.

It should be noted that the above-mentioned computer-readable medium in the present disclosure may be a computer-readable signal medium or a computer-readable storage medium, or any combination thereof. The computer-readable storage medium may be, for example, but not limited to, an electrical, a magnetic, an optical, an electromagnetic, an infrared, or a semiconductor system, apparatus, or device, or any combination thereof. More specific examples of the computer-readable storage medium may include, but are not limited to: an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium that includes or stores a program, and the program may be used by or in combination with an instruction execution system, apparatus, or device. In the present disclosure, the computer-readable signal medium may include a data signal propagated in a baseband or as a part of a carrier wave, and a computer-readable program code is carried therein. This propagated data signal may take many forms, including but not limited to an electromagnetic signal, an optical signal, or any suitable combination thereof. The computer readable signal medium may also be any computer readable medium other than the computer readable storage medium, and the computer readable signal medium may send, propagate, or transmit the program used by or in combination with the instruction execution system, apparatus, or device. The program code included on the computer-readable medium may be transmitted by any suitable medium, including but not limited to: a wire, an optical cable, RF (Radio Frequency), etc., or any suitable combination thereof.

The above-mentioned computer-readable medium may be included in the above-mentioned electronic device; or it may exist alone without being assembled into the electronic device.

The above computer-readable medium carries one or more programs, and when the foregoing one or more programs are executed by the electronic device, the electronic device is caused to execute the method shown in the foregoing embodiment.

The computer program code for performing the operations of the present disclosure may be written in one or more programming languages or a combination thereof. The above-mentioned programming languages include object-oriented programming languages—such as Java, Smalltalk, C++, and also include conventional procedural programming language—such as "C" language or similar programming language. The program code may be executed entirely on a user computer, partly on a user computer, executed as an independent software package, partly executed on a user computer and partly executed on a remote computer, or entirely executed on a remote computer or server. In the case where a remote computer is involved, the remote computer may be connected to the user computer through any kind of network, including a local area network (LAN) or a wide area network (WAN), or may be connected to an external computer (for example, through an Internet connection by using an Internet service provider).

The flowcharts and block diagrams in the accompanying drawings illustrate possible implementation architecture, functions, and operations of the system, method, and computer program product according to the embodiments of the present disclosure. In this point, each block in the flowchart or block diagram may represent a module, a program segment, or a part of code, and the module, the program segment, or the part of code contains one or more executable instructions for implementing a designated logical function. It should also be noted that, in some alternative implementations, the functions marked in the blocks may also occur in a different order from the order marked in the drawings. For example, two blocks shown one after another may actually be executed substantially in parallel, or sometimes may be executed in a reverse order, which depends on the functions involved. It should also be noted that each block in the block diagram and/or flowchart, and the combination of the blocks in the block diagram and/or flowchart, may be implemented by a dedicated hardware-based system that performs the specified functions or operations, or may be implemented by a combination of dedicated hardware and computer instructions.

The units involved in the embodiments described in the present disclosure may be implemented in software or hardware. A name of a unit does not constitute a limitation on the unit itself in some cases.

The functions described herein above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and so on.

In the context of the present disclosure, a machine-readable medium may be a tangible medium, which may contain or store a program for use by or in combination with an instruction execution system, apparatus or device. The machine-readable medium may be a machine-readable signal medium or a machine-readable storage medium. The machine-readable medium may include, but is not limited to, an electronic, a magnetic, an optical, an electromagnetic, an infrared, or a semiconductor system, apparatus, or device, or any suitable combination thereof. More specific examples of the machine-readable storage medium may include an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In a first aspect, according to one or more embodiments of the present disclosure, a method for generating an imagery record is provided, which is applied to a terminal device and includes:

detecting being within a triggering period, and displaying at least one anniversary card on a first application interface, where the triggering period is determined based on a target anniversary corresponding to a target user; triggering the anniversary card to display an imagery record generating page, where the imagery record generating page is used to generate template information corresponding to the anniversary card, and the template information is determined based on the target anniversary; in response to a first user instruction for the imagery record generating page, generating target imagery data, where the first user instruction is used to acquire source imagery data, and the target imagery data is generated based on the source imagery data and the template information.

According to one or more embodiments of the present disclosure, the first application interface is an information stream interface, and the detecting being within the triggering period and displaying at least one anniversary card on the first application interface includes: detecting being within the triggering period according to an activity information table; in response to determining being within the triggering period, receiving the target message; and displaying the at least one anniversary card on the information stream interface based on the target message.

According to one or more embodiments of the present disclosure, the detecting being within the triggering period and displaying at least one anniversary card on the first application interface includes: displaying the at least one anniversary card within the triggering period and after the information stream interface is refreshed for a preset number of rounds.

According to one or more embodiments of the present disclosure, the preset number of rounds is determined based on an amount of information of concern which has not been read, and the information of concern is high-priority recommendation information.

According to one or more embodiments of the present disclosure, the detecting being within a triggering period and displaying at least one anniversary card on the first application interface includes: displaying the at least one anniversary card within a target period of the triggering period, where the target period is determined based on running history data.

According to one or more embodiments of the present disclosure, the displaying the anniversary card on the first application interface includes: displaying at least one anniversary card corresponding to a target anniversary type on the first application interface.

According to one or more embodiments of the present disclosure, the template information includes at least one of the following: a background image, a background special effect, background music, a transition method, or a camera movement direction.

According to one or more embodiments of the present disclosure, the source imagery data includes a video or a picture, and the imagery record generating page is displayed on a second application interface; the generating, in response to the first user instruction for the imagery record generating page, the target imagery data includes: displaying a template corresponding to the anniversary card on the second application interface based on the imagery record generating page; in response to the first user instruction, acquiring a target video or a target picture, and displaying the target video or the target picture at a target position on the second application interface; and in response to a second user instruction, rendering the template information displayed on the second application interface and the target picture or the target video displayed on the second application interface into the target imagery data.

According to one or more embodiments of the present disclosure, before generating, in response to the first user instruction for the imagery record generating page, the target imagery data, the method further includes: in response to a third user instruction, modifying a configuration parameter of the imagery record generating page, where the configuration parameter is used to set a characteristic of template information generated by the imagery record generating page.

According to one or more embodiments of the present disclosure, after generating the target imagery data, the method further includes: releasing the target imagery data.

In a second aspect, according to one or more embodiments of the present disclosure, a method for generating an imagery record is provided, which is applied to a server and includes:

acquiring anniversary time information, where the anniversary time information indicates a triggering period of a target anniversary corresponding to a target user; sending triggering information according to the anniversary time information, to display an anniversary card on a first application interface within the triggering period, where the anniversary card, after being triggered, is used to generate target imagery data corresponding to the target anniversary, and the target imagery data is combined imagery data comprising source imagery data and template information corresponding to the target anniversary.

According to one or more embodiments of the present disclosure, the method further includes: receiving the target imagery data to release.

In a third aspect, according to one or more embodiments of the present disclosure, an apparatus for generating an imagery record is provided, which is applied to a terminal device and includes:

a displaying module, configured to detect being within a triggering period, and display at least one anniversary card on a first application interface, where the triggering period is determined based on a target anniversary corresponding to a target user;

a triggering module, configured to trigger the anniversary card to display an imagery record generating page, wherein the imagery record generating page is used to generate template information corresponding to the anniversary card, and the template information is determined based on the target anniversary; and a generating module, configured to generate, in response to a first user instruction for the imagery record generating page, target imagery data, where the first user instruction is used to acquire source imagery data, and the target imagery data is generated based on the source imagery data and the template information.

According to one or more embodiments of the present disclosure, the first application interface is an information stream interface, and the displaying module is specifically configured to: detect being within the triggering period according to an activity information table; in response to determining being within the triggering period, receive the target message; and display the at least one anniversary card on the information stream interface based on the target message.

According to one or more embodiments of the present disclosure, when detecting being within a triggering period and displaying at least one anniversary card on the first application interface, the displaying module is specifically configured to: display the at least one anniversary card within the triggering period and after the information stream interface is refreshed for a preset number of rounds.

According to one or more embodiments of the present disclosure, the preset number of rounds is determined based on an amount of information of concern which has not been read, and the information of concern is high-priority recommendation information.

According to one or more embodiments of the present disclosure, when detecting being within a triggering period and displaying at least one anniversary card on the first application interface, the displaying module is specifically configured to: display the at least one anniversary card within a target period of the triggering period, where the target period is determined based on running history data.

According to one or more embodiments of the present disclosure, when displaying the anniversary card on the first application interface, the displaying module is specifically configured to: display at least one anniversary card corresponding to a target anniversary type on the first application interface.

According to one or more embodiments of the present disclosure, the template information includes at least one of the following:

a background image, a background special effect, background music, a transition method, or a camera movement direction.

According to one or more embodiments of the present disclosure, the source imagery data includes a video or a picture, and the imagery record generating page is displayed on a second application interface; the generating module is specifically configured to: display, based on the imagery record generating page, a template corresponding to the anniversary card on the second application interface; in response to the first user instruction, acquire a target video or a target picture, and display the target video or the target picture at a target position on the second application interface; in response to a second user instruction, render the template information displayed on the second application interface and the target picture or the target video displayed on the second application interface into the target imagery data.

According to one or more embodiments of the present disclosure, before generating, in response to the first user instruction for the imagery record generating page, the target imagery data, the generating module is further configured to: in response to a third user instruction, modify a configuration parameter of the imagery record generating page, where the configuration parameter is used to set a characteristic of template information generated by the imagery record generating page.

According to one or more embodiments of the present disclosure, after generating the target imagery data, the generating module is further configured to: release the target imagery data.

In a fourth aspect, according to one or more embodiments of the present disclosure, an apparatus for generating an imagery record is provided, including:

an acquiring module, configured to acquire anniversary time information, where the anniversary time information indicates a triggering period of a target anniversary corresponding to a target user; and a transceiving module, configured to send a triggering information according to the anniversary time information, to display an anniversary card on a first application interface within the triggering period, where the anniversary card, after being triggered, is used to generate target anniversary imagery data corresponding to the target anniversary, and the target imagery data is combined imagery data comprising source imagery data and template information corresponding to the target anniversary.

In an embodiment of the present disclosure, the transceiving module is further configured to: receive the target imagery data to release.

In a fifth aspect, according to one or more embodiments of the present disclosure, an electronic device is provided, including: a processor, and a memory communicatively connected to the processor; where the memory stores a computer-executable instruction; and the processor executes the computer-executable instruction stored in the memory to implement the method for generating an imagery record according to the above first aspect and any possible designs of the first aspect, or, to implement the method for generating an imagery record according to the above second aspect and any possible designs of the second aspect.

In a sixth aspect, according to one or more embodiments of the present disclosure, a computer-readable storage medium is provided, where the computer-readable storage medium has a computer-executable instruction stored thereon, and when a processor executes the computer-executable instruction, the method for generating an imagery record according to the above first aspect and any possible designs of the first aspect, or, the method for generating an imagery record according to the above second aspect and any possible designs of the second aspect is implemented.

In a seventh aspect, an embodiment of the present disclosure provides a computer program product, including a computer program, where when the computer program is executed by a processor, the method for generating an imagery record according to the above first aspect and any possible designs of the first aspect, or, the method for generating an imagery record according to the above second aspect and any possible designs of the second aspect is implemented.

The above description is only preferred embodiments of the present disclosure and an explanation of the applied technical principles. Those skilled in the art should understand that the scope of disclosure involved in the present disclosure is not limited to the technical solutions formed by the specific combinations of the above technical features, and should also cover other technical solutions formed by the above technical features or equivalent features without departing from the above disclosed concept. For example, the above-mentioned features and the technical features disclosed in the present disclosure (but not limited to) having similar functions are replaced with each other to form a technical solution.

In addition, although operations are described in a specific order, this should not be understood as requiring these operations to be performed in the specific order or in a sequential order shown. Under certain circumstances, multitasking and parallel processing may be advantageous. Similarly, although several specific implementation details are included in the above discussion, they should not be interpreted as limiting the scope of the present disclosure. Certain features that are described in the context of separate embodiments may also be implemented in combination in a single embodiment. On the contrary, various features described in the context of a single embodiment may also be implemented in multiple embodiments individually or in any suitable subcombination.

Although the subject matter has been described in language specific to a structural feature and/or a logical action of the method, it should be understood that the subject matter defined in the appended claims is not necessarily limited to the specific features or actions described above. On the contrary, the specific features and actions described above are only example forms for implementing the claims.

What is claimed is:

1. A method for generating an imagery record, comprising:

detecting being within a triggering period, and displaying at least one anniversary card on a first application interface, wherein the triggering period is determined based on a target anniversary corresponding to a target user, and the first application interface is an information stream interface;

triggering the anniversary card to display an imagery record generating page, wherein the imagery record generating page is used to generate template information corresponding to the anniversary card, and the template information is determined based on the target anniversary; and generating, in response to a first user instruction for the imagery record generating page, target imagery data, wherein the first user instruction is used to acquire source imagery data, and the target imagery data is generated based on the source imagery data and the template information;

wherein the detecting being within the triggering period and displaying the at least one anniversary card on the first application interface comprises:

displaying the at least one anniversary card within the triggering period and after the information stream interface is refreshed for a preset number of rounds, wherein the preset number of rounds is related to an amount of information of concern which has not been read.

2. The method according to claim 1, further comprising:

sending activity information to a server, wherein the activity information indicates that a target application is in an active state, and the first application interface is an interface of the target application;

receiving a target message from the server, wherein the target message is transmitted by the server within the triggering period; and displaying, based on the target message, the at least one anniversary card on the information stream interface.

3. The method according to claim 1, wherein the information of concern is high-priority recommendation information.

4. The method according to claim 1, wherein the displaying the anniversary card on the first application interface comprises:

displaying at least one anniversary card corresponding to a target anniversary type on the first application interface.

5. The method according to claim 1, wherein the template information comprises at least one of the following:

a background image, a background special effect, background music, a transition method, or a camera movement direction.

6. The method according to claim 1, wherein the source imagery data comprises a video or a picture, and the imagery record generating page is displayed on a second application interface; the generating, in response to the first user instruction for the imagery record generating page, the target imagery data comprises:

displaying, based on the imagery record generating page, a template corresponding to the anniversary card on the second application interface;

in response to the first user instruction, acquiring a target video or a target picture, and displaying the target video or the target picture at a target position on the second application interface; and rendering, in response to a second user instruction, the template information displayed on the second application interface and the target picture or the target video displayed on the second application interface into the target imagery data.

7. The method according to claim 1, wherein before the generating, in response to the first user instruction for the imagery record generating page, the target imagery data, the method further comprises:

modifying, in response to a third user instruction, a configuration parameter of the imagery record generating page, wherein the configuration parameter is used to set a characteristic of template information generated by the imagery record generating page.

8. The method according to claim 1, after the generating the target imagery data, further comprising:

releasing the target imagery data.

9. A non-transitory computer-readable storage medium, wherein the non-transitory computer-readable storage medium has a computer-executable instruction stored therein, and when a processor executes the computer-executable instruction, the method for generating an imagery record according to claim 1 is implemented.

10. A method for generating an imagery record, comprising:

acquiring anniversary time information, wherein the anniversary time information indicates a triggering period of a target anniversary corresponding to a target user; and sending triggering information according to the anniversary time information, to display an anniversary card on a first application interface within the triggering period, wherein the anniversary card, after being triggered, is used to generate target imagery data corresponding to the target anniversary, and the target imagery data is combined imagery data comprising source imagery data and template information corresponding to the target anniversary; wherein the first application interface is an information stream interface, the anniversary card is displayed within the triggering period and after the information stream interface is refreshed for a preset number of rounds, wherein the preset number of rounds is related to an amount of information of concern which has not been read.

11. The method according to claim 10, wherein the method further comprises:

receiving target imagery data to release.

12. An apparatus for generating an imagery record, comprising: a processor, and a memory communicatively connected to the processor;

wherein the memory stores a computer-executable instruction; and the processor executes the computer-executable instruction stored in the memory to implement the method for generating an imagery record according to claim 10.

13. A non-transitory computer-readable storage medium, wherein the non-transitory computer-readable storage medium has a computer-executable instruction stored therein, and when a processor executes the computer-executable instruction, the method for generating an imagery record according to claim 10 is implemented.

14. The method according to claim 10, further comprising:

receiving activity information, wherein the activity information indicates that a target application is in an active state, and the first application interface is an interface of the target application;

wherein the sending triggering information according to the anniversary time information comprises:

sending a target message according to the activity information and the anniversary time information.

15. An apparatus for generating an imagery record, comprising:

at least one processor; and a memory communicatively connected to the at least one processor; wherein, the memory stores instructions executable by the at least one processor, and the instructions are executed by the at least one processor, so that the at least one processor is configured to:

detect being within a triggering period and display at least one anniversary card on a first application interface, wherein the triggering period is determined based on a target anniversary corresponding to a target user;

trigger the anniversary card to display an imagery record generating page, wherein the imagery record generating page is used to generate template information corresponding to the anniversary card, and the template information is determined based on the target anniversary; and generate, in response to a first user instruction for the imagery record generating page, target imagery data, wherein the first user instruction is used to acquire source imagery data, and the target imagery data is generated based on the source imagery data and the template information;

wherein the at least one processor is specifically configured to:

display the at least one anniversary card within a target period of the triggering period, wherein the target period is determined based on a historical running record of a target application, and the first application interface is an interface of the target application.

16. The apparatus according to claim 15, wherein the first application interface is an information stream interface, and the at least one processor is specifically configured to:

send activity information to a server, wherein the activity information indicates that a target application is in an active state, and the first application interface is an interface of the target application;

receive a target message from the server, wherein the target message is transmitted by the server within the triggering period; and display, based on the target message, the at least one anniversary card on the information stream interface.

* * * * *